US010964118B2

(12) United States Patent
Shapira

(10) Patent No.: US 10,964,118 B2
(45) Date of Patent: Mar. 30, 2021

(54) AUGMENTED UNIFICATION OF REAL AND OBJECT RECOGNIZED ATTRIBUTES

(71) Applicant: Particle Ink, LLC, Richmond, TX (US)

(72) Inventor: Sephi Joseph Shapira, New York, NY (US)

(73) Assignee: PARTICLE INK, LLC, Richmond, TX (US)

( * ) Notice: Subject to any disclaimer, the term of this patent is extended or adjusted under 35 U.S.C. 154(b) by 0 days.

(21) Appl. No.: 16/920,200

(22) Filed: Jul. 2, 2020

(65) Prior Publication Data

US 2020/0334463 A1 Oct. 22, 2020

Related U.S. Application Data

(60) Provisional application No. 63/024,282, filed on May 13, 2020, provisional application No. 63/013,894, filed on Apr. 22, 2020.

(51) Int. Cl.
*G06T 19/00* (2011.01)
*G06K 9/00* (2006.01)

(52) U.S. Cl.
CPC ........ *G06T 19/006* (2013.01); *G06K 9/00671* (2013.01)

(58) Field of Classification Search
CPC .............. A63F 13/47; A63F 13/60–69; G06K 9/00671; G06T 19/206
See application file for complete search history.

(56) References Cited

U.S. PATENT DOCUMENTS

| 2015/0078232 | A1* | 3/2015 | Djinki | ................... H04W 74/02 370/311 |
| 2016/0314609 | A1* | 10/2016 | Taylor | ..................... A63F 13/65 |
| 2016/0342432 | A1* | 11/2016 | Ofek | ...................... A63F 13/79 |
| 2016/0379591 | A1* | 12/2016 | Oya | .................... G02B 27/0101 345/633 |
| 2017/0080338 | A1* | 3/2017 | Zalewski | .............. A63F 13/213 |
| 2019/0251751 | A1* | 8/2019 | DeFaria | .................. G06F 3/013 |

* cited by examiner

*Primary Examiner* — Diane M Wills
(74) *Attorney, Agent, or Firm* — Mannava & Kang, P.C.; Hean L. Koo

(57) ABSTRACT

Systems and methods of using augmented reality (AR) with object recognition (OR) in a physical environment to advance a narrative may be provided. For example, the system may access narrative data representing the narrative. The system may, for a first node of the one or more nodes: generate a user interface associated with the narrative for the first node and access a first decision rule specifying a first physical object to be recognized to advance past the first node in the narrative. The system may further perform image recognition on an image of the physical environment, determine that the first physical object is in the physical environment based on the image recognition, transition from the first node in the narrative based on the first decision rule and the determination, and update the user interface to a second node in the narrative based on the transition from the first node.

20 Claims, 8 Drawing Sheets

US 10,964,118 B2

AUGMENTED UNIFICATION OF REAL AND OBJECT RECOGNIZED ATTRIBUTES

RELATED APPLICATIONS

This application claims priority to U.S. Provisional Patent Application Ser. No. 63/013,894, filed Apr. 22, 2020, and U.S. Provisional Patent Application Ser. No. 63/024,282, filed May 13, 2020, the contents of each of which are incorporated by reference in their entireties herein.

BACKGROUND

Augment Reality (AR) displays may provide graphical information overlaid onto a physical environment. For example, a description of a physical object may be overlaid onto the physical object. Mixed Reality (MR) displays may further include artificial objects (used interchangeably with "virtual" to denote non-physical objects generated by an AR display) such as an image of furniture that may be moved about the physical environment. For purposes of this description, AR will be described as encompassing MR.

BRIEF DESCRIPTION OF THE DRAWINGS

FIG. 1A illustrates an example of a system of providing a narrative based on AR and/or OR.

FIG. 9 illustrates an example of a method of providing a narrative based on AR and/or OR.

DETAILED DESCRIPTION OF THE INVENTION

Figure 1A:
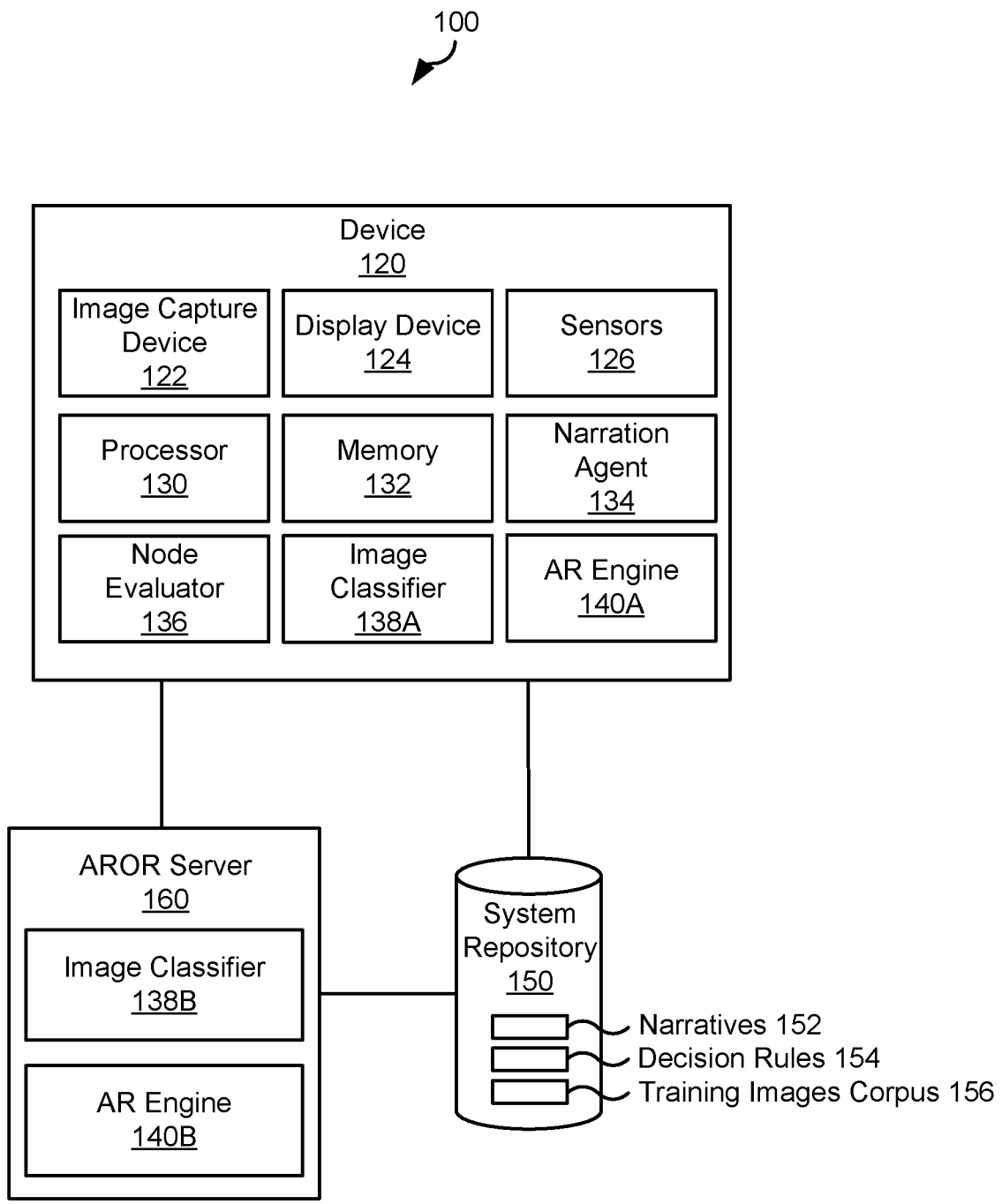

The disclosure relates to improved AR systems and displays that provide augmented unification (AU), which is an interactive experience in the real-world where objects are identified with image processing and their attributes determined using artificial intelligence (AI) in order to enhance the experience of the environment with computer-generated perceptual information. In some examples, an AR system may generate an AR display in which virtual objects may interact with physical objects recognized through AI image classifiers trained through machine-learning.

For example, the AR system may use the image classifier to classify physical objects in a physical environment. As a non-limiting example, the AR system may use an image classifier to recognize a physical heat source such as a real flame and cause an AR display to depict a virtual ice cube being melted in the AR display. In this manner, the AR system may unify interactivity between virtual objects and physical objects. More particularly, the AR system may unify interaction of a physical object on a virtual object. It should be noted that the term "physical object" may refer to anything that exists in the physical environment and is not computer-generated whereas the term "virtual object" may refer to an image in the AR display that is computer-generated and does not exist in the physical environment (apart from its representation in the physical environment).

In some examples, based on image classifications output by the image classifier, the AR system may determine that a set of one or more physical objects have been recognized in the physical environment. The AR system may identify a location based on the recognized physical objects and drive the AR display based on the identified location. For example, the AR system may determine that a user is in a particular room of a building, such as a kitchen in a home, based on recognition of certain kitchen-related objects like cooking utensils, cabinetry, appliances and the like. The AR system may make such location identifications by accessing and applying machine-readable decision rules. In these examples, the decision rules may specify that certain objects or combinations of objects are associated with various locations. Alternatively, or additionally, such location identification may be driven by an image classifier trained to recognize certain locations (such as rooms in a home, retail locations such as a grocery or electronics store, and/or other types of locations). In this case, the image classifier may be trained based on a training images corpus that includes images that are labeled according to types of locations to be recognized (such as labeled images of kitchens). For examples in which a room inside a building such as a home is identified, the AR system may mitigate problems with localizing specific areas inside a building because Global Positioning System (GPS) and other localization signals may be accurate outdoors but may not sufficiently penetrate indoor locations.

In some examples, AR systems may be improved to provide interactive narratives based on object recognition. Narratives may relate to an interactive live performance, AR-based game, AR-based literary work such as a novel. A narrative may be advanced based on decision rules that specify conditions be met in order to transition to another part of the narrative. In some examples, such conditions may be dynamic in that if a first decision rule is satisfied, the narrative may transition to a first part of the narrative and if a second decision rule is satisfied, the narrative may transition to a second part of the narrative. The conditions may include a requirement that one or more physical objects be present (and be imaged in an AR display) in the physical environment, an action be taken by a user in the physical and/or augmented environment, one or more ambient conditions or other sensed conditions be present, and/or other types of requirements. In some examples, the condition may relate to a requirement that the user is in a particular location such as a room in a home. If the user is determined to be in the kitchen, for example, the narrative may be transitioned to a portion of the narrative designed take place in the kitchen.

It should be noted that the narrative need not be a continuous narrative. For example, a user may open an AR display, the AR system may recognize one or more objects, and the AR system may determine that the user is in the kitchen based on the recognized one or more objects. The AR system may then update the AR display based on the determination that the user is in the kitchen. In another example, a user may open the AR display and the system may recognize an object such as a baseball bat and start a virtual batting session in the AR display in which case a virtual baseball is to be hit. In this example, depending on the physical object(s) that are recognized, the AR system may provide different narratives. For example, if a physical golf club is recognized, the AR system may start a virtual golf range or golfing session in the AR display in which a virtual golf ball is to be hit. In another example, if both the physical golf club and a physical golf ball are recognized, the AR system may not provide an image of the virtual golf ball to be hit and instead provide only virtual scenery (where various virtual objects like virtual trees of the virtual scenery may be "virtually hit" by the physical golf ball) in the AR display.

Examples that follow may describe object recognition (through machine-learning (ML) image classification) as a condition to control a narrative. However, other types of conditions may be used in addition or instead of object recognition. In the context of an interactive live performance, live human actors and/or audience members may gather objects to place in a scene, which may be imaged via an AR display, and the storyline (including virtual characters in the AR display that may accompany live human actors) presented via the AR display may be advanced based on whether and which objects are placed in the scene. In the context of an AR-based game, a level may require that one or more objects be imaged to pass the level. In the context of an AR-based literary work, different plots or otherwise different portions of the literary work may dynamically change based on what objects have been imaged.

FIG. 1A illustrates an example of a system 100 of providing a narrative based on AR and/or OR. The system 100 may include a device 120, a system repository 150, an Augmented Reality or Object Recognition (AROR) server 160, and/or other components.

The device 120 may be a computing device such as smartphone, a wearable computing device such as a pair of AR glasses, and/or other computing device. The device 120 may include an image capture device 122, a display device 124, a sensor 126, a processor 130, a memory 132, an AR engine 140A, and/or other components. The image capture device 122 may include a camera that includes an image sensor. The image capture device 122 may be onboard or offboard, so long as the device 120 is able to image a physical environment, including a physical object 110 in the physical environment.

The display device 124 may include a device to display a Graphical User Interface (GUI). In some examples, the graphical user interface may include an AR display or other type of GUI. As used herein, an "AR display" may refer to a display that includes a physical environment as captured by the image capture device 122 and AR user interface display features such as graphics, video, images, text, etc., that may be presented with (such as overlaid onto) the captured image of the physical environment to augment the captured image.

The sensor 126 may include a device that senses a physical environment or the device 120 with respect to the physical environment. For example, the sensor 126 may include a gyroscope, a light sensor, a temperature sensor, and/or other type of sensor.

The processor 130 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 130, it should be understood that the apparatus 100 may include multiple processors, multiple cores, or the like, without departing from the scope of the apparatus 100 disclosed herein.

The memory 132 may be an electronic, magnetic, optical, or other physical storage device that includes or stores executable instructions. The memory 132 may be, for example, Random Access memory (RAM), an Electrically Erasable Programmable Read-Only Memory (EEPROM), a storage device, an optical disc, and the like. The memory 132 may be a non-transitory machine-readable storage medium, where the term "non-transitory" does not encompass transitory propagating signals. It should be understood that the example apparatus 100 depicted in FIG. 1 may include additional features and that some of the features described herein may be removed and/or modified without departing from the scope of the example apparatus 100.

The narration agent 134 may include hardware and/or instructions that program the processor 130, in which case the instructions may be stored on the memory 132. In some examples, the narration agent 134 may be configured as an AR-based mobile application such as a viewer application to view interactive live performances, a reader application that provides text and/or graphic novels, a mobile gaming application, and/or other application executing on the device 120.

The narration agent 134 may access and provide a narrative 152 to a user through the display device 124. A narrative 152 may refer to a storyline that generally advances from one or more points to one or more other points. For example, the narrative 152 may be levels or other parts of a game that is advanced through gameplay, part of an interactive live performance such as a theatrical production, part of a plot of a novel or other literary work, and/or other type of storyline. In some examples, a narrative 152 may have one or more starting points and one or more ending points. In other examples, a narrative 152 may not a specific ending point. In these examples, a live performance or literary work may not have a defined ending and a game may be played continuously.

Figure 2:
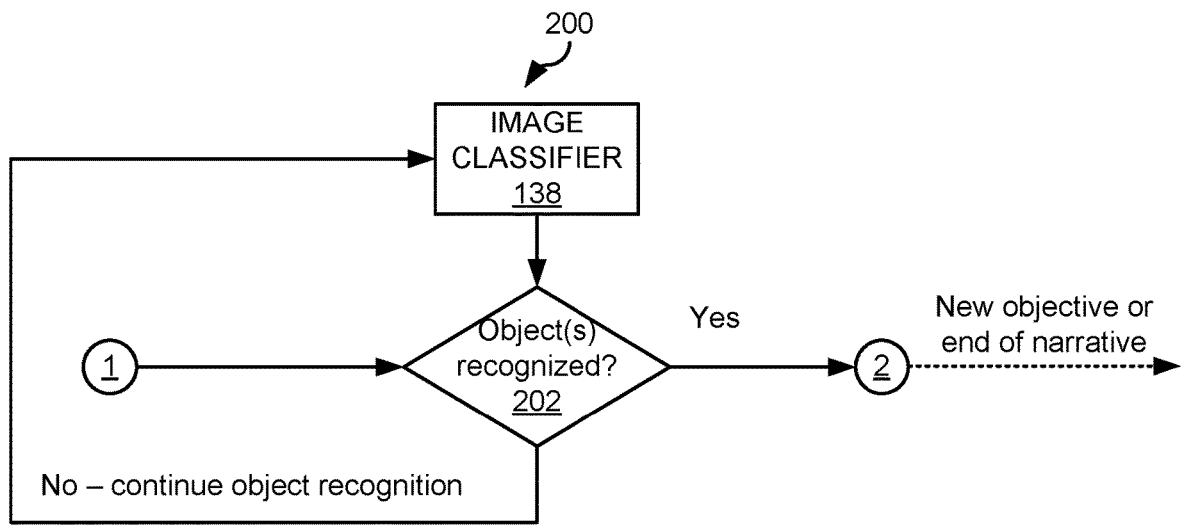
FIG. 2 illustrates a data flow diagram of an example of evaluating a decision rule resulting in a binary result for a linear narrative.
Figure 3:
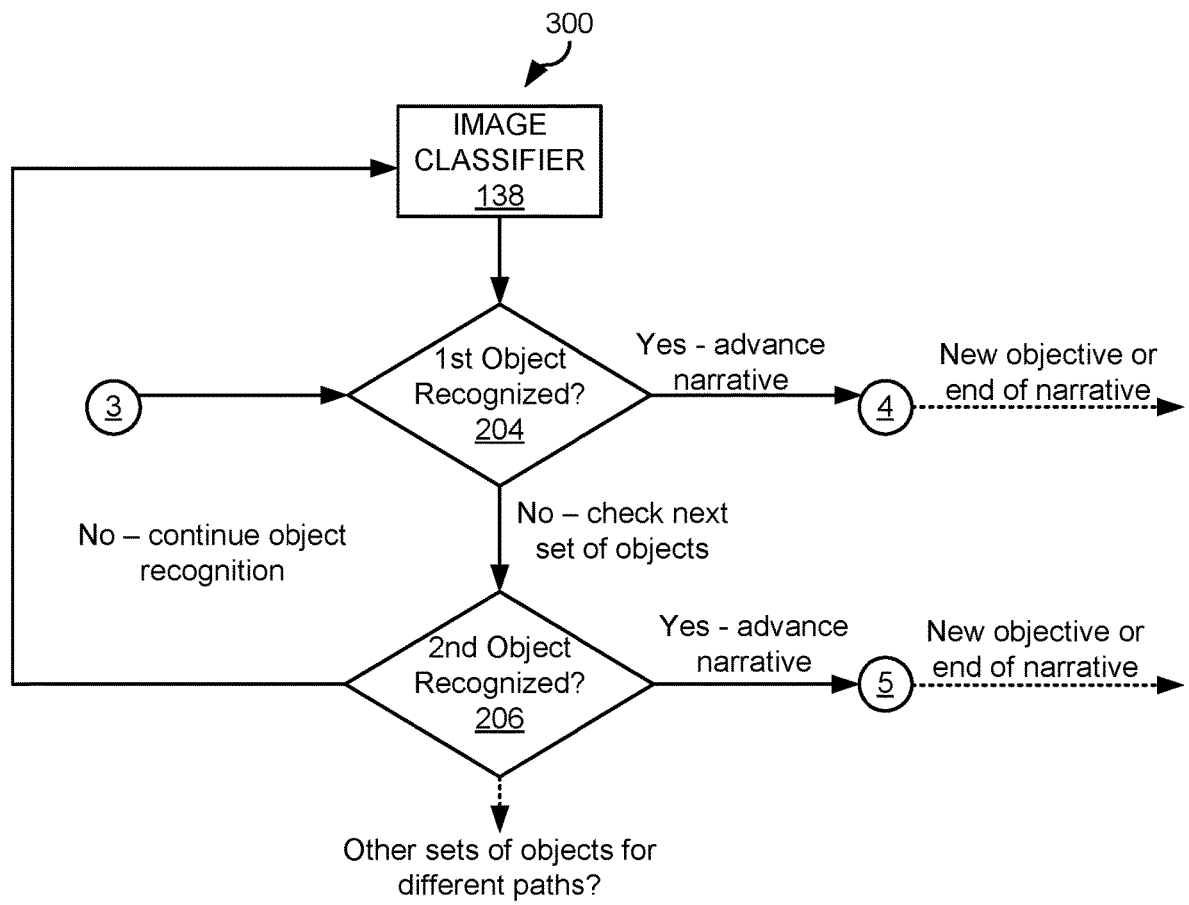
FIG. 3 illustrates a data flow diagram of an example of evaluating a decision rule resulting in a non-binary result for a non-linear narrative.
Figure 4:
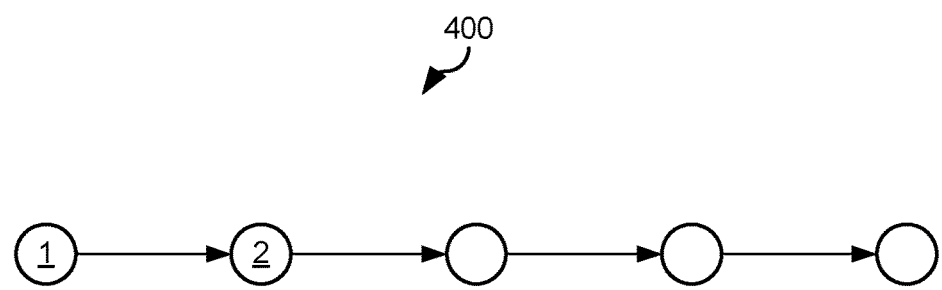
FIG. 4 illustrates a schematic diagram of an example of nodes in a linear narrative.

In some examples, the narrative 152 may be represented as a plurality of nodes (illustrated in FIGS. 2-4 as nodes numbered 1-5, although other numbers of nodes may be used). A node may refer to data and/or logic that represents a portion of the narrative. For example, a node may represent an act in an interactive live performance, a game level in a game, a chapter in a novel, and/or other part of the narrative 152. The narrative 152 may be interactive in that the user may be required to find one or more physical objects (evidenced through image recognition of the physical objects), perform one or more actions, and/or otherwise interact with the physical environment to advance the storyline.

In some examples, each node may be associated with one or more decision rules 154. A decision rule 152 may refer to a rule applied by the narration agent 134 (and therefore by the processor 130 programmed by the narration agent 134) to determine whether to transition the node to another node in the plurality of nodes. A decision rule 152 may specify a condition that is to be met in order to transition to another node. The condition may require that one or more physical objects be present in the physical environment, one or more ambient or environment conditions be present in the physical environment, one or more sensor readings be read in the physical environment, one or more actions be taken by the user in the physical environment, and/or other conditions. In some examples, a decision rule 152 may specify a generic condition be satisfied. The generic condition may refer to a non-specific way to achieve the condition. For example, a generic condition may include a condition that a heat source be recognized or applied to satisfy the decision rule 152. The generic condition may be satisfied by a range of options such as by imaging an actual (physical) heat source such as a candle, lighter, or other physical object capable of providing heat, applying an actual heat source to a temperature sensor, and so forth. In contrast, some conditions may be specific such as a requirement to image a particular physical object. IN some examples, the decision rule 152 may specify an AR-guided interaction to be performed, such as an AR-guided interaction described in U.S. Provisional Application Ser. No. 63/013,894, filed Apr. 22, 2020, which was incorporated by reference in its entirety herein.

In some examples, when a node is associated with more than one decision rule 152, all of the decision rules 152 for the node may have to be satisfied in order to transition to another node. In other examples, only some of the decision rules 152 may have to be satisfied in order to transition to another node. In some of these examples, the satisfaction of a first set of one or more decision rules 152 may result in transitioning to a first other node, while the satisfaction of a second set of one or more decision rules 152 may result in transitioning to a second other node, and so on. Thus, depending on which decision rules 152 have been satisfied, the narrative may be transitioned to different nodes.

Figure 5:
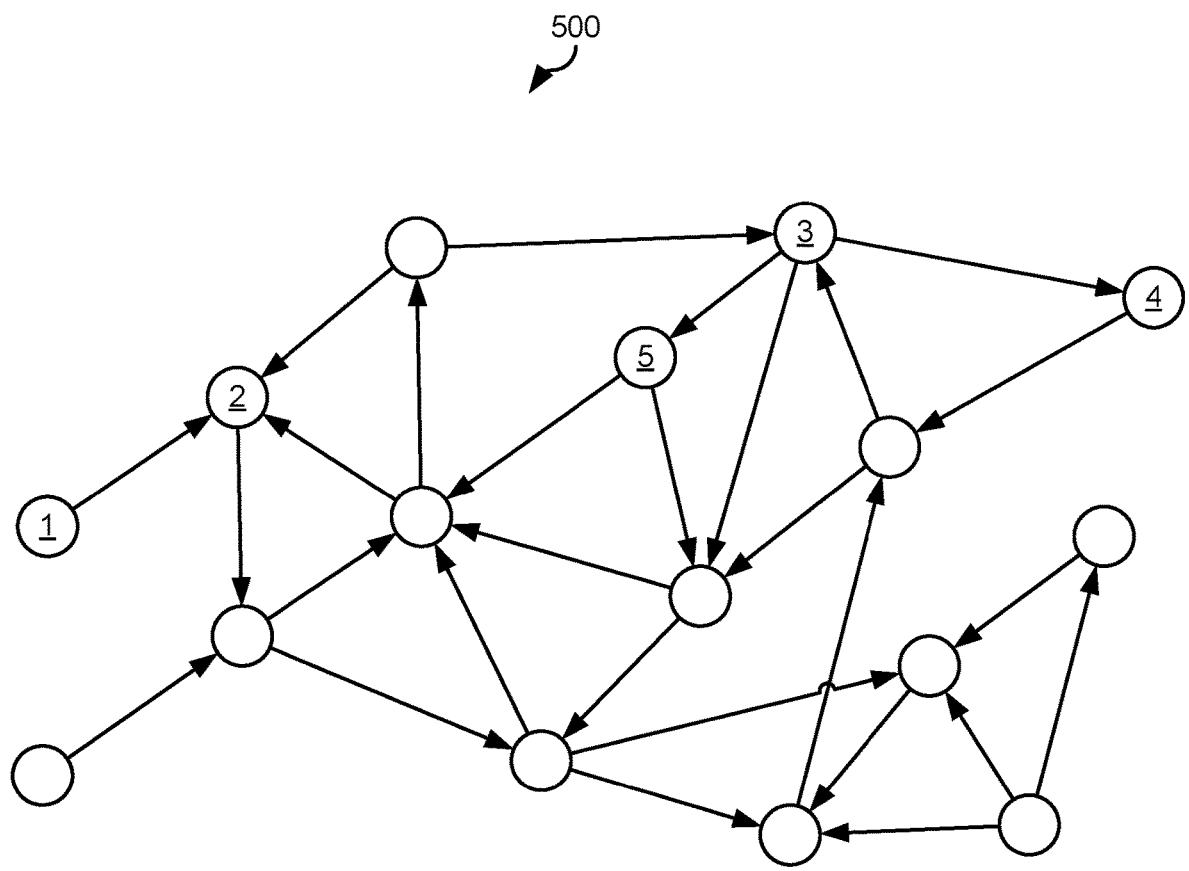
FIG. 5 illustrates a schematic diagram of an example of nodes in a non-linear narrative.

In some examples, the narrative 152 may be linear in that nodes may be arranged in a linear fashion such that the nodes may be transitioned to one another in series, an example of which is illustrated in FIG. 4. In other examples, the narrative 152 may be dynamic in that the nodes may be arranged in a non-linear fashion such that a given node may be transitioned to any of two or more nodes in any direction as specified by the corresponding decision rules 152, an example of which is illustrated in FIG. 5. It should be understood that some parts of a narrative 152 may be linear while other parts of the narrative 152 may be non-linear. For example, referring to FIG. 5, the nodes 1→2 may exhibit linearity while other parts of the narrative 152 may exhibit non-linearity. It should be noted that, in some examples, a node be an activation node that is not associated with a particular narrative 152. In these examples, a user may open an AR application (executing the narration agent 134), which may begin recognizing physical objects to determine which narrative 152 is to be presented. In this sense, the activation node may not necessarily be part of a specific narrative 152, but rather is used to identify and select a narrative 152 to initiate based on the recognized physical object(s). The selected narrative 152 may be part of an interactive live performance, a game (such as starting a virtual baseball or virtual golf in previous examples), a literary work, and so forth. In some examples, the narration agent 134 may select a particular narrative 152 based on a location (such as a room) that is identified based on the recognized physical object(s). For example, the narration agent 134 may determine that the user is in a bedroom and begin a narrative 152 based on the determination that the user is in a bedroom.

In some examples, the narration agent 134 may invoke a node evaluator 136. The node evaluator 136 may include hardware and/or instructions that program the processor 130, in which case the instructions may be stored on the memory 132. The node evaluator 136 may evaluate the one or more decisions rules 154 for a given node to determine whether the decisions rules 154 have been satisfied. For example, if a decision rule 154 requires recognition of one or more objects in the physical environment, then the node evaluator 136 may invoke the image classifier 138A and/or 138B to determine whether objects have been recognized in the physical environment. If a decision rule 154 requires certain ambient conditions to be present (such as a certain temperature, humidity, etc.) or speed or motion to be present, then the node evaluator 136 may use sensor data from the sensors 126. If a decision rule 154 requires an action to be made (such as a user action in the physical environment), then the node evaluator 136 may invoke the AR engine 140A and/or 140B to determine whether such action has been performed.

The image classifier 138A may include hardware and/or instructions that program the processor 130, in which case the instructions may be stored on the memory 132. The image classifier 138A may be trained to perform image recognition on a training images corpus 156, which may include labeled images. Each labeled image in the training images corpus 156 may indicate an item (such as a person, animal, thing, etc.) that is in the image. In some examples, training images corpus 156 may include additional features for training such as object segmentation (to be able to distinguish multiple objects in an image), recognition in context to support contextual image recognition, and/or other features. Examples of the training images corpus 156 may include the MNIST dataset, MS-COCO dataset, ImageNet dataset, Open Images Dataset, CIFAR-10 dataset, CIFAR-100 dataset, and/or other image training datasets.

Image recognition may refer providing an image to a neural network, which may output a label for the image. The label may correspond to a pre-defined class. The image may be labelled according to one or multiple classes. If labeled as a single class, the term "recognition" may be applied, whereas a multi-class recognition may be called "classification". The image classifier 138 may use recognition and/or classification. However, it should be noted that as used herein "object recognition" may refer to an object recognized in an image, whether through recognition or classification.

A subset of image classification may include object detection, where specific instances of objects are identified as belonging to a certain class such as animals, cars, people, or other object classes. In some examples, the neural network may perform feature extraction. Features in an image may include groups of pixels, such as edges and points, of an object that the network may analyze for patterns that may be recognized. The neural network may extract relevant features from an input image so that these features can be analyzed. In some examples, the training images corpus 156 may include annotations or metadata about a given image that indicates relevant features. To do so, the first layer of the neural network may analyze all the pixels within an image. Different filters may be applied to the image to generate feature maps, which forms representations of different parts of the image.

In some examples, neural network may use a Convolutional Neural Network (CNN) architecture. The CNN may employ image filters that determine how many pixels are analyzed at a given time. Typically, though not necessarily, the filter size may be a 3×3 area of pixels, although other filter sizes may be used. Digital images may be rendered as height, width, and color value such as a Red, Green, Blue (RGB) color value representing a depth of the image.

Grayscale (non-color) images only have 1 color channel while color images have 3 depth channels corresponding to the RGB color value.

After the feature map of the image has been created, the values that represent the image may be passed through an activation layer. The activation layer may take values that represent the image, which are in a linear form from the convolutional layer, and increases their non-linearity.

One example of an activation layer may include a Rectified Linear Unit (ReLU), although others may be used. The activated data may be sent through a pooling layer. Pooling may compress the image data, rendering analysis more efficient since usually only the irrelevant aspects of the image are not retained by such pooling. After pooling, only relevant parts of an input image may remain, which may mitigate or prevent overfitting, in which the neural network learns aspects of the training image with too much specificity to be able to apply to other images.

One example of pooling includes max pooling, in which the maximum value of the pixels within a single filter (within a single spot in the image) is retained for analysis. The maximum values of the pixels are used in order to account for possible image distortions, and the parameters/size of the image are reduced in order to control for overfitting. Other types of max pooling may be used as well.

The final layers of the CNN may use data in the form of a vector. The data may therefore be compressed into a long vector or a column of sequentially ordered numbers. The final layers of the CNN may include densely connected layers, or an artificial neural network (ANN). The ANN may analyze the input features and combine them into different attributes for image classification. The ANN may include computational neurons that each recognize different parts of an object. For example, a collection of neurons may represent a recognizable portion of a physical object to be recognized. When a sufficient number of neurons are activated in response to an input image, the image may be classified as an object.

In some examples, the device 120 may communicate with the AROR server 160 so that the AROR server 160 may perform some or all of the processing performed by the image classifier 138A. In these examples, the device 120 may transmit captured images to the AROR server 160 for processing by image classifier 138B, which may perform similar functionality as the image classifier 138A.

In some examples, the narration agent 134 may provide the narrative through an AR display generated by the AR engine 140A (and/or AR engine 140B). The AR engine 140A may include hardware and/or instructions that program the processor 130, in which case the instructions may be stored on the memory 132. The AR engine 140A may access the captured image from the image capture device 122, recognize one or more AR elements (such as AR markers), and generate an AR display to provide the narrative 152. As previously noted, such narrative 152 may include an interactive live performance, in which case the AR display may be used by an audience member to view and interact with the interactive live performance through AR, a game, in which case the AR display may provide visuals (which may include audio) of the gameplay, and a literary work, in which case the AR display may provide an interactive story.

In some examples, the device 120 may communicate with the AROR server 160 so that the AROR server 160 may perform some or all of the processing performed by the AR engine 140A. In these examples, the device 120 may transmit captured images to the AROR server 160 for processing by AR engine 140B, which may perform similar functionality as the AR engine 140A. For example, the AROR server 160 may also include a processor (not illustrated for convenience), a memory (not illustrated for convenience), and its version of the AR engine 140B. More generally, the AR engine 140 or portions thereof may be executed on the device 120 and/or the AROR server 160. As such, the functionality of AR engines 140A,B will be generally described in terms of functionality of an AR engine 140.

The system repository 150 may store various data used by the system 100. For example, the system repository 150 may store the narratives 152, the decision rules 154, the training images corpus 156, and/or other data. Each of data stored in the system repository 150 may be in individual storage repositories or combined together. For example, the system repository may include a repository for the narratives 152, a repository for the decision rules 154, and a repository for the training images corpus 156.

Figure 1B:
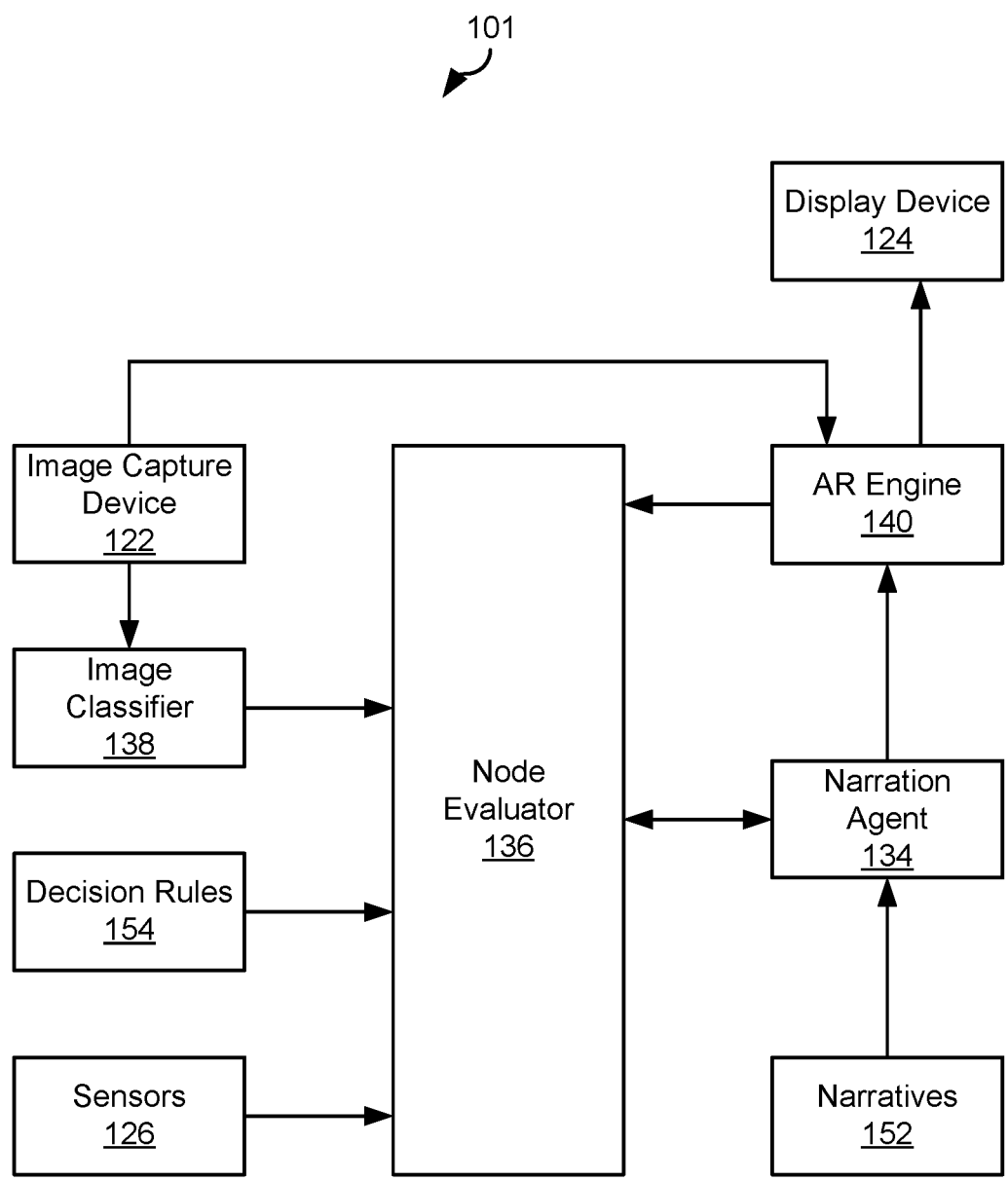
FIG. 1B illustrates a data flow diagram of an example set of operations of the system illustrated in FIG. 1A.

FIG. 1B illustrates a data flow diagram 101 of an example set of operations of the system 100 illustrated in FIG. 1A. The example set of operations will be described in the context of an AR-based game for illustration. Other types of interactive media such as for interactive live performances and literary works, among others, may be provided.

The narration agent 134 may access a narrative 152 and one or more nodes of the narrative 152. The narration agent 134 may identify a current node in the narrative 152 to display through the display device 124. The current node may be an initial starting node (such as a beginning level, stage, or location of a game) or a saved node (such as a saved level, stage, or location of the game). The narration agent 134 may provide images, text, audio, and/or other data associated with the current node. For example, the images, text, audio, and/or other data may provide gameplay for the current node.

The narration agent 134 may invoke the node evaluator 136 to determine whether to transition to another node in the narrative 152. For example, the narration agent 134 may provide the node evaluator with a node identifier (node ID) that identifies the current node. The node evaluator 136 may access decision rules 154 associated with the node. For example, the node evaluator 136 may look up decision rules 154 that may be stored in association with the node ID.

The narration agent 134 may evaluate the decision rules 154 against various input sources that may be relevant to the decision rules 154. For example, the node evaluator 136 may access sensor data from the sensors 126 to determine whether any sensor-related decision rules 154 have been satisfied. One example of a sensor-related decision rule 154 may include a requirement that the ambient temperature be at least a certain temperature or that the device 120 is travelling at a certain speed or is at a certain location (such as based on Global Positioning System (GPS) coordinates from a GPS sensor). In another example, the node evaluator 136 may access data from the AR engine 140 to determine whether any action-related decision rules 154 requiring actions by a user in with respect to the AR display have been satisfied. One example of an action-related decision rule 154 may include a requirement that a user perform some action, such as perform a task in the physical environment, recognized by the AR engine 140. For example, the AR engine 140 may determine whether an AR anchor has been manipulated or whether the user has placed an object in a field of view that corresponds with a graphical image generated by the AR engine 140. In a particular example, the graphical image may be an AR-generated character that needs to traverse a space in the physical environment and the required action may be for the user to assist the AR-generated character by building a bridge or other physical action that affects the physical environment such that the AR-generated character may pass.

In still another example, the node evaluator 136 may access image classifications of the image classifier 138 (which may refer to the image classifier 138A and/or 138B) to determine whether any Object Recognition (OR)-related decision rules 154 have been satisfied. The image classifier 138 may perform image recognition on images of the physical environment captured by the image capture device 122. For example, the image classifier 138 may output a set of image classifications. Each image classification may represent a probability that an object (such as a person, thing, place, etc.) was recognized in the image by the image classifier 138. In some examples, the node evaluator 136 may determine that an object was recognized when a probability meets or exceeds a threshold probability. Thus, for a given set of classifications, more than one object may be deemed to be recognized in the image of the physical environment if more than one corresponding image classifications meets or exceeds the threshold probability. Accordingly, the node evaluator 136 may determine that one or more objects have been recognized in the physical environment based on image classifications of the image classifier 138. The node evaluator 136 may evaluate the OR-related decision rules 154 by determining whether any of the objects required to be recognized have been recognized in the physical environment.

In some examples, the node evaluator 136 may output a binary result. That is, the node evaluator 136 may output a positive (1) or negative (0) evaluation result that indicates whether or not the decision rules 154 have been satisfied. In these examples, the portion of the narrative 152 associated with the current node may linearly transition to a next node.

In other examples, the node evaluator 136 may output a variable result that identifies: that the current node should not be transitioned to another node or an identification of another node to which to transition. In these examples, the portion of the narrative 152 associated with the current node may transition to two or more different nodes in the narrative depending on which decision rules 154 have been satisfied.

FIG. 2 illustrates a data flow diagram 200 of an example of evaluating a decision rule resulting in a binary result for a linear narrative. In this example, node 1 is the current node, which may transition to another node (node 2) if the decision rule(s) associated with node 1 are satisfied. In this example, the decision rule may specify one or more objects to be recognized, such as by the image classifier 138. If the one or more objects are recognized at 202, then the result may be positive and the narrative may be transitioned from node 1 to node 2. If the one or more objects are not recognized, then the result may be negative and object recognition may continue. It should be noted that guidance information that includes the conditions specified by the decision rule may be provided to the user (such as through the display device 124). It should be further noted that block 202 may include other conditions other than object recognition that must be satisfied before a positive result is determined.

FIG. 3 illustrates a data flow diagram 300 of an example of evaluating a decision rule resulting in a non-binary result for a non-linear narrative. In this example, node 3 is the current node, which may transition to another node (node 4, node 5, or other node) depending on which of the narrative rules associated with node 3 is satisfied. For example, a first decision rule may specify that if the conditions of the first decision rule are satisfied then the narrative is to transition to node 4. In this example, the first decision rule may include a node ID that identifies the node 4 as a target node to which to be transitioned. Similarly, a second decision rule may specify that if the conditions of the second decision rule are satisfied then the narrative is to transition to node 5. In this example, the second decision rule may include a node ID that identifies the node 5 as a target node to which to be transitioned. As illustrated, the first decision rule may specify that a first object (one or more first objects) is to be recognized and the second decision rule may specify that a second object (one or more second objects) is to be recognized. Accordingly, at 204, if the first object is recognized by the image classifier 138, then the evaluation result may be to transition to node 4. Otherwise, at 206, if the second object is recognized by the image classifier 138, then the evaluation result may be to transition to node 5. Other decision rules may specify other conditions for other node transitions may be evaluated as well. It should be further noted that that first and second decision rules may be combined into a single decision rule that is evaluated together to determine which node is to be transitioned to. It should be further noted that the conditions may be evaluated in parallel. In these examples, each condition may be prioritized as a tie-break procedure. For example, if the conditions of the first decision rule and the second decision rule are both satisfied, the node evaluator 136 may apply a priority rule that determines that the first decision rule is to take priority and therefore that node 4 is to be transitioned to instead of node 5.

Figure 6:
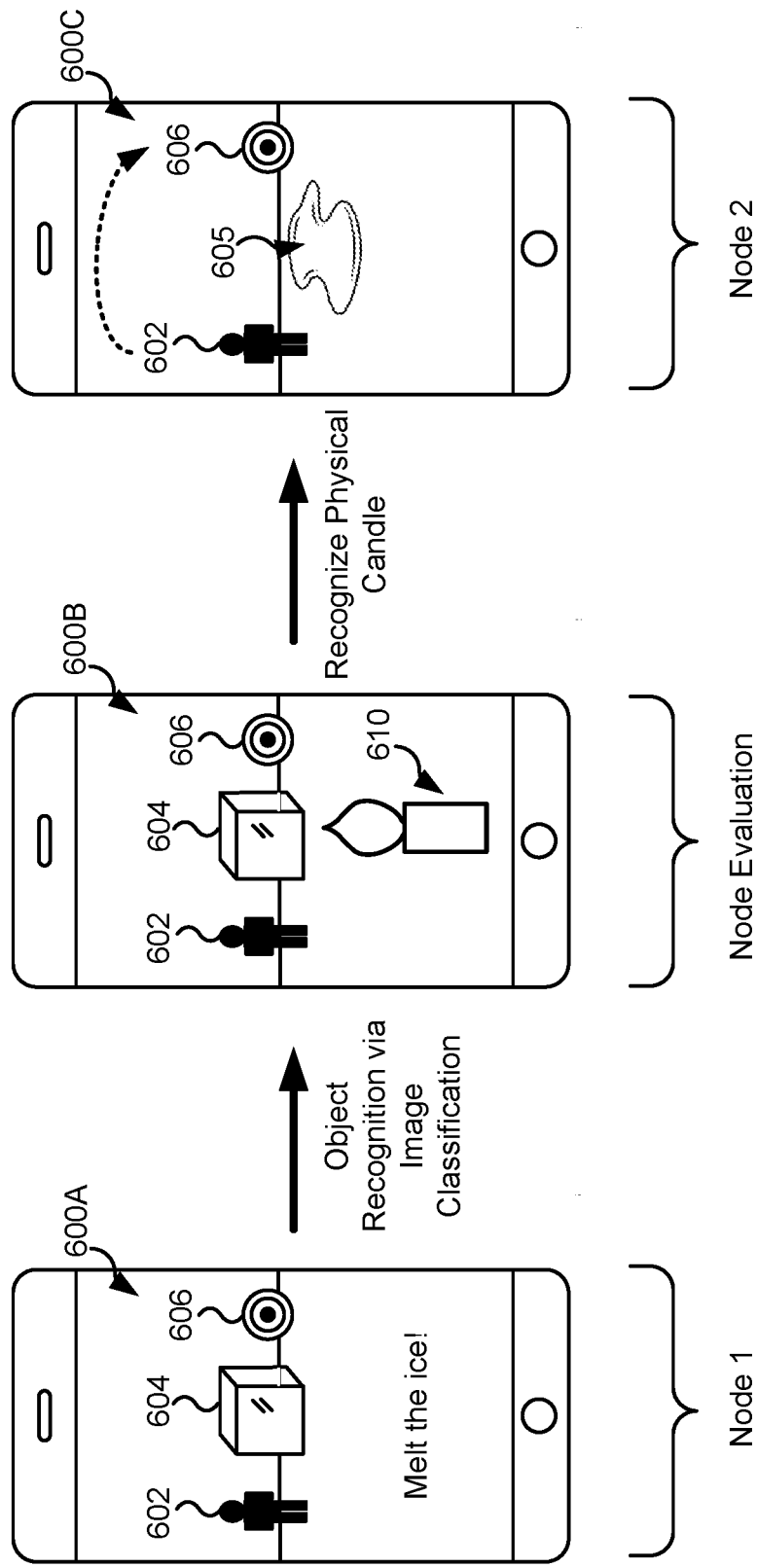
FIG. 6 illustrates an example of evaluating a node of a narrative in an AR display based on object recognition to determine whether to transition to another node in the narrative.

FIG. 6 illustrates an example of evaluating a node (illustrated as Node 1) of a narrative in an AR display 600 (illustrated as AR display 600A,B,C) based on object recognition to determine whether to transition to another node (illustrated as Node 2) in the narrative. AR displays 600A, 600B, and 600C may respectively refer to first, second, and third states of an AR display.

AR display 600A may display Node 1 of a narrative 152. Node 1 is illustrated as corresponding to a level in an AR game in which an objective in the level is to get an AR character 602 (which is a virtual character generated by the AR display 600A). However, other types of AR displays (such as relating to an interactive live theatrical production, a literary work, and so forth) may be implemented as well. The AR character 602 may be blocked by a virtual ice block 604 (a virtual image generated by the AR display 600A) from reaching an AR goal 606 (a virtual goal generated by the AR display 600A). The objective may be to melt the ice by providing a heat source. The Node 1 may be associated with a decision rule 154 that specifies that the heat source be detected. In some examples, the decision rule 154 may specify that the heat source be recognized through object recognition. Alternatively, or additionally, other types of recognition (such as through a temperature or light sensor) may be specified by the decision rule 154.

During node evaluation, the AR display 600B may provide an image of a captured physical heat source (illustrated as a physical candle 610 that is a physical object in the physical environment). The physical candle 610 may be imaged, for example, by the image capture device 122. Upon recognition of the physical candle 610, the node evaluator 136 may determine that the decision rule 154 associated with the Node 1 has been satisfied and may provide an indication of such satisfaction to the narration agent 134, which may cause the AR display 600C to be displayed. The AR display 600C may provide an indication of the satisfaction of the decision rule 154 associated with the Node 1. For example, the AR display 600C may include an AR image 605 that represents a melted block of ice.

In some examples, the node evaluator 136 may determine whether the physical object recognized in the physical environment has made sufficient interaction with the virtual object. For example, the node evaluator 136 may determine whether the recognized physical candle 610 is imaged in close enough proximity to the virtual ice block 604. To do so, the node evaluator 136 may consult the AR engine 140 to determine whether the imaged physical candle 610 is sufficiently close to the virtual ice block 604 in the AR display. For example, the imaged physical candle 610 in the AR display may be required to be within a certain number of pixels from the location in the AR display at which the virtual ice block 604 is displayed. In some examples, the decision rule 154 may further specify an interactivity function between the physical object and the virtual object. For example, the interactivity function may define a rate of virtual melting with a pixel distance (number of pixels) between the imaged physical candle 610 and the virtual ice block 604 in the AR display. Other types of interactivity functions may be based on other attributes of the physical object, such as intensity of a light source, size of the object, and so forth. For example, an interactivity functions relating to intensity of the light source may cause a virtual character adverse to light to react differently based on the intensity. In another example, a larger physical object recognized in the physical environment may have a greater (as compared to a smaller physical object) virtual physics effect on a virtual object when contact between the physical object and the virtual object in the AR display occurs. A virtual physics effect may refer to an effect displayed in the AR display in which a physical object imparts a simulated force or other reaction on a virtual object in the AR display. In yet another example, a faster-moving physical object recognized in the physical environment (in which the speed may be measured based on rate of movement across a number of frames) may have a greater virtual physics effect on the virtual object.

It should be noted that the foregoing example is provided for illustration. Other types of images and objectives may be used as well or instead of the description provided in the foregoing example.

Figure 7:
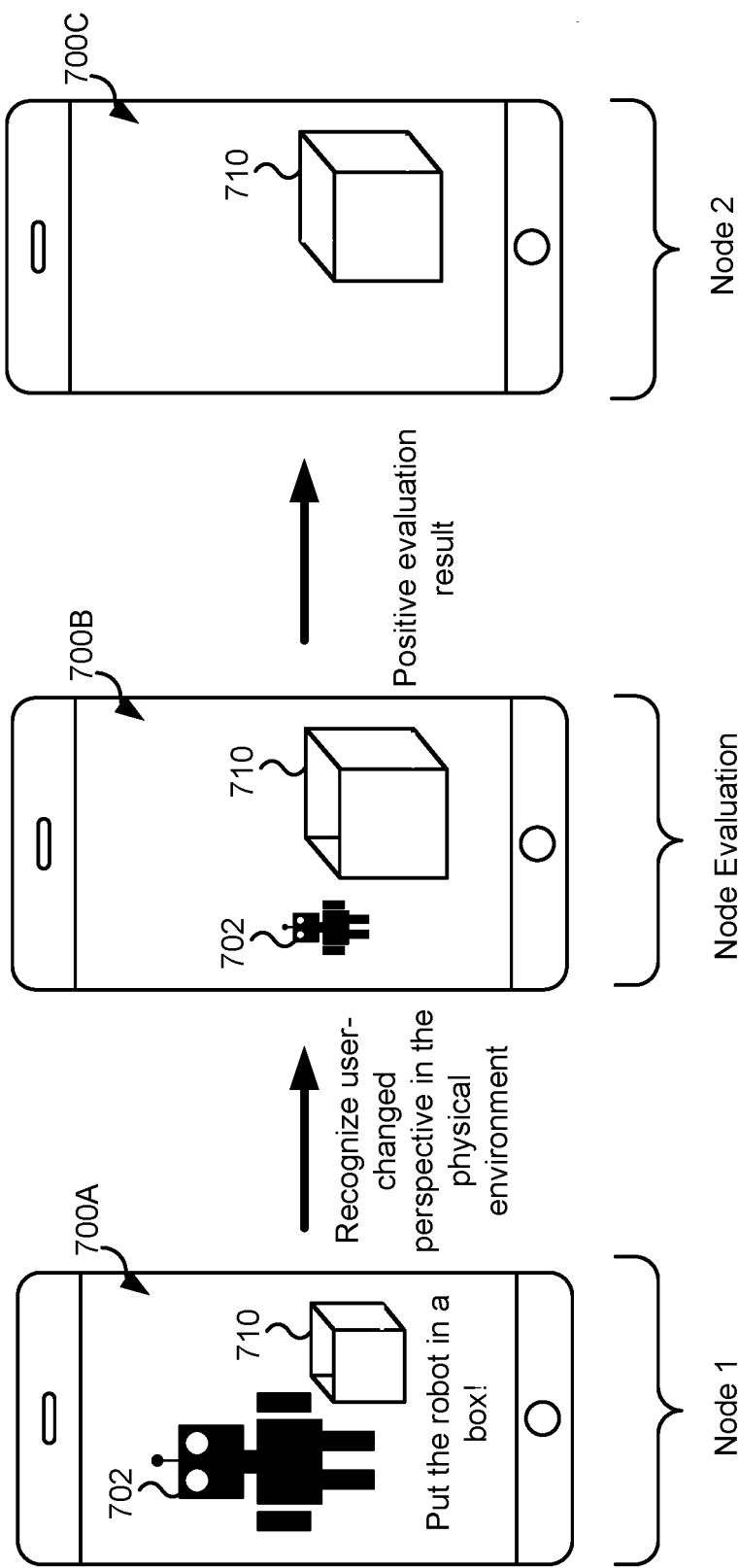
FIG. 7 illustrates an example of evaluating a node of a narrative in an AR display based on user actions to determine whether to transition to another node in the narrative.

FIG. 7 illustrates an example of evaluating a node of a narrative in an AR display 700 (illustrated as AR display 700A,B,C) based on user actions to determine whether to transition to another node in the narrative. Node evaluation and provision of the AR display 700 may occur in a manner similar to the AR display 600 illustrated in FIG. 6. In this example, however, the objective of the decision rule 154 may be a user action to be performed. In the illustrated example, the user action may be to change the perspective size of an image created by the image capture device 122 such as by zooming in or out, or by moving the device 120 closer to or further from a physical object in the physical environment (illustrated as a physical box 710). The objective may be to change the perspective size of the physical box 710 to be larger than a virtual character 702. During node evaluation, the physical box 710 may be made larger by the user by changing perspective. Once the physical box 710 is determined to be sufficiently large, the AR display 700B may indicate that the decision rule 152 has been satisfied. In this example, the decision rule 152 may include an object recognition condition (such as to recognize a physical box) and a user action (such as to change perspective). As with FIG. 6, other types of images and objectives may be used as well or instead of the description provided in the foregoing example.

Figure 8:
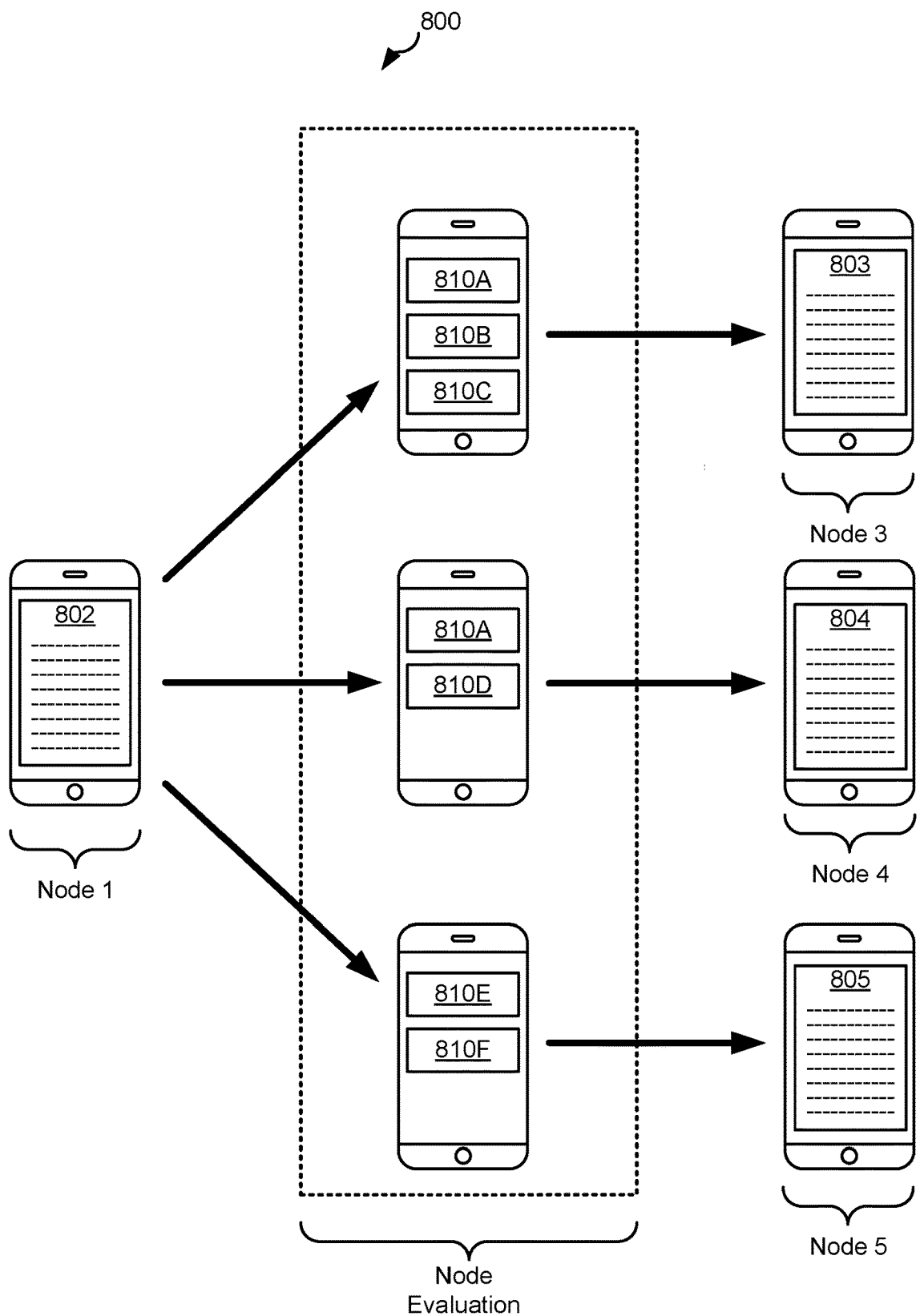
FIG. 8 illustrates an example of evaluating a node of a narrative in an AR display to determine whether and which node to which to transition in the narrative.

FIG. 8 illustrates an example of evaluating a node of a narrative in an AR display to determine whether and which node to which to transition in the narrative. In this example, the AR display may provide different portions 802, 803, 804, or 805 of a literary work such as a novel. Such portions 802, 803, 804, or 805 may include text and/or images. Depending on the current node (illustrated as Node 1) and/or node evaluation, the different portions 802, 803, 804, or 805 may be provided. One or more decision rules 152 associated with Node 1 may specify that different nodes (illustrated as Nodes 3-5) be transitioned to depending on different conditions. For example, as illustrated, the one or more decision rules 152 may specify that if a first set of physical objects 810A-C are recognized, transition to Node 3 having portions 803; if a second set of physical objects 810A and D are recognized, transition to Node 4 having portions 804; and if a third set of physical objects 810E and F are recognized, transition to Node 5 having portions 805. It should be noted that there may (or may not) be overlap in the objects that are to be recognized. For example, physical object 810A may be required to be recognized to transition to Node 3 or Node 4 (along with other physical objects as illustrated). According to this example, depending on what objects are recognized in the physical environment, a different portion of the narrative 152 may be provided. As with FIG. 6, other types of objectives may be used as well or instead of the description provided in the foregoing example. It should be further noted that the node evaluation illustrated in FIG. 8 may be used in other contexts such as games or interactive live theatrical productions.

Figure 9:
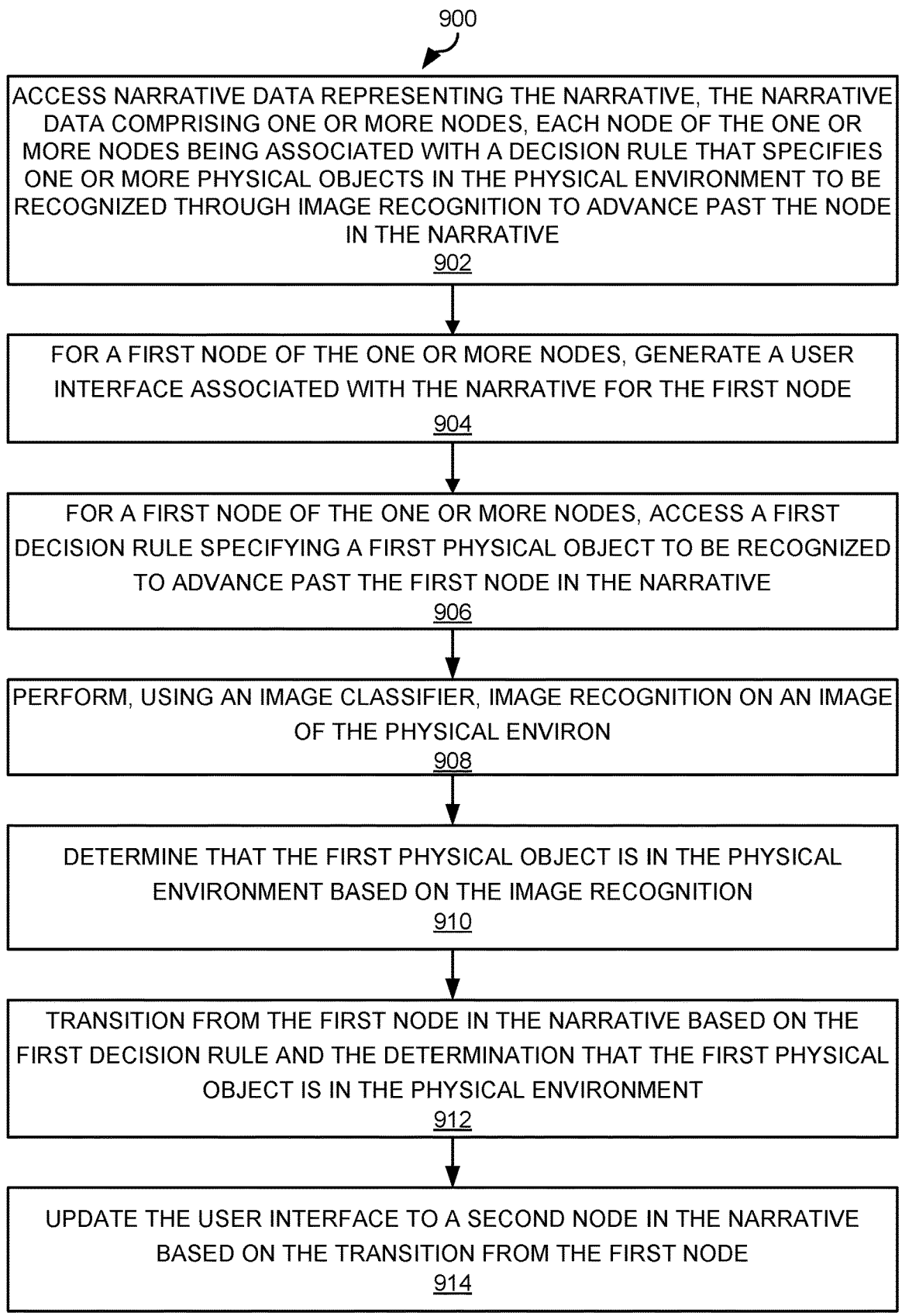

FIG. 9 illustrates an example of a method 900 of providing a narrative based on AR and/or OR. It should be understood that the method 900 may include additional operations and that some of the operations described therein may be removed and/or modified without departing from the scope of the methods. The description of the method 900 may be made with reference to the features depicted in the previous figures for purposes of illustration.

At 902, the method 900 may include accessing narrative data representing the narrative, the narrative data comprising one or more nodes, each node of the one or more nodes being associated with a decision rule that specifies one or more physical objects in the physical environment to be recognized through image recognition to advance past the node in the narrative. At 904, for a first node of the one or more nodes, the method 900 may include generating a user interface associated with the narrative for the first node. At 906, for a first node of the one or more nodes, the method 900 may include accessing a first decision rule specifying a first physical object to be recognized to advance past the first node in the narrative. At 908, the method 900 may include performing, using an image classifier (such as image classifier 138), image recognition on an image of the physical environment. At 910, the method 900 may include determining that the first physical object is in the physical environment based on the image recognition. At 912, the method 900 may include transitioning from the first node in the narrative based on the first decision rule and the determination that the first physical object is in the physical environment. At 914, the method 900 may include updating the user interface to a second node in the narrative based on the transition from the first node.

The various examples provided herein were illustrative in nature. Other types of interactive physical tasks may be guided as well. For example, the physical tasks may relate to repairing a physical object in which various interactive physical tasks along the process of repair may be guided. The interactive physical tasks may relate to training an individual to perform the tasks on the physical object. The interactive physical tasks may relate showing proof of sobriety, such as at a bar to reveal an additional object such as a drink (where an inebriated individual may be unable to perform the interactive physical tasks. Thus, various examples of uses of the improved AR display systems and methods would be apparent based on the disclosure herein.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor 130 may each be programmed by one or more additional instructions that may perform some or all of the functionality attributed herein to one of the instructions.

The processor 130 may each include one or more physical processors that are programmed by computer program instructions. The various instructions described herein are exemplary only. Other configurations and numbers of instructions may be used, so long as the processor 130 are each programmed to perform the functions described herein. Furthermore, it should be appreciated that although the various instructions in the figures as being co-located within a single processing unit, in implementations in which processor 130 may each include multiple processing units, one or more instructions may be executed remotely from the other instructions.

The various repositories such as the system repository 150 described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The various components illustrated in the Figures may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in the drawing figures are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system of providing augmented reality (AR) with object recognition in a physical environment to advance a narrative, comprising:
a processor programmed to:
access narrative data representing the narrative, the narrative data comprising one or more nodes, each node of the one or more nodes being associated with a decision rule that specifies one or more physical objects in the physical environment to be recognized through image recognition to advance past the node in the narrative;
for a first node of the one or more nodes:
generate a user interface associated with the narrative for the first node, the user interface including a first virtual object and a real image of a first physical object captured by an image capture device in the physical environment, the first virtual object being overlaid onto a view of the physical environment that includes the first physical object and the first virtual object being programmed to react to and interact with, in the user interface, the real image of the first physical object;
access a first decision rule specifying the first physical object to be recognized to advance past the first node in the narrative;
perform, using an image classifier, image recognition on an image of the physical environment;
determine that the first physical object is in the physical environment based on the image recognition;
generate, in the user interface, a virtual interaction by the first virtual object with the real image of the first physical object so that the first virtual object is displayed to be overlaid onto the view of the physical environment and the real image of the first physical object captured by the image capture device and interact with the real image of the first physical object captured by the image capture device and imaged in the user interface;
transition from the first node in the narrative based on the first decision rule and the determination that the first physical object is in the physical environment; and
update the user interface to a second node in the narrative based on the transition from the first node, the second node comprising a result of the virtual interaction between the first virtual object and the real image of the first physical object in the user interface.

2. The system of claim 1, wherein the first decision rule further specifies a second physical object to be recognized to advance past the first node, wherein the processor is further programmed to:
advance past the first node only if the second physical object is also determined to be in the physical environment based on the image recognition.

3. The system of claim 1, wherein the first decision rule specifies a plurality of physical objects, including the first physical object, to be recognized to advance past the first node, wherein the processor is further programmed to:

advance to a second node responsive to a determination that a first set of objects among the plurality of objects is in the physical environment; and advance to a third node responsive to a determination that a second set of objects among the plurality of objects is in the physical environment.

4. The system of claim 1, wherein the first decision rule further specifies an action to be performed with respect to the first physical object to advance past the first node.

5. The system of claim 4, wherein the user interface displays a first virtual object, the action to be performed comprises causing the first physical object to be within a sufficient proximity to a virtual object displayed by the user interface, and wherein the processor is further programmed to:

determine whether the first physical object imaged in the user interface is within the sufficient proximity to the virtual object in the user interface.

6. The system of claim 5, wherein to determine whether the first physical object imaged in the user interface is within the sufficient proximity to the virtual object in the user interface, the processor is further programmed to:

determine whether pixels of the first physical object imaged in the user interface is within a threshold number of pixels of the virtual object displayed in the user interface.

7. The system of claim 5, wherein the processor is further programmed to:

determine that the first physical object imaged in the user interface is within the sufficient proximity to the virtual object not representative of the first physical object in the user interface;

determine that an interaction has occurred between the first physical object imaged in the user interface and the virtual object in the user interface based on the determination that the first physical object imaged in the user interface is within the sufficient proximity to the virtual object in the user interface; and display a result of the interaction in the user interface.

8. The system of claim 1, wherein to generate the virtual interaction, the processor is further programmed to:

apply an interactivity function to the first virtual object, the interactivity function defining the virtual interaction between the first virtual object and the image of the first physical object in the user interface based on the physical characteristic.

9. The system of claim 8, wherein the physical characteristic comprises an intensity of light or a size of the first physical object, and wherein the interactivity function defines a quantitative aspect of the virtual interaction based on the intensity of the light or the size of the first physical object.

10. The system of claim 8, wherein the physical characteristic comprises a size of the first physical object, and wherein the processor is further programmed to:

determine that a contact in the user interface between the first virtual object and the first physical object has occurred; and responsive to the contact, generate, based on the interactivity function and the size of the first physical object, an effect on the virtual object in the user interface in which the first physical object imparts a simulated force on the virtual object in the user interface.

11. The system of claim 1, wherein the processor is further programmed to:

identify a room in the physical environment in which the room is located based on the determination that the first physical object is in the physical environment; and wherein the transition from the first node in the narrative is based further on the identification of the room.

12. The system of claim 1, wherein the processor is further programmed to:

identify a first game to be played in the user interface based on the determination that the first physical object is in the physical environment, wherein the first physical object is assigned to and associated with the first game; and identify a second game to be played in the user interface based on a determination that a second physical object is in the physical environment, wherein the second physical object is assigned to and associated with the second game.

13. A method of providing augmented reality (AR) with object recognition in a physical environment to advance a narrative, the comprising:

accessing, by a processor, narrative data representing the narrative, the narrative data comprising one or more nodes, each node of the one or more nodes being associated with a decision rule that specifies one or more physical objects in the physical environment to be recognized through image recognition to advance past the node in the narrative;

for a first node of the one or more nodes:

generating, by the processor, a user interface associated with the narrative for the first node, the user interface including a first virtual object overlaid onto a view of the physical environment that includes a first physical object captured by an image capture device, the first virtual object being programmed to react to and interact with, in the user interface, the first physical object that is imaged in the physical environment;

accessing, by the processor, a first decision rule specifying the first physical object to be recognized to advance past the first node in the narrative;

performing, by the processor, using an image classifier, image recognition on an image of the physical environment;

determining, by the processor, that the first physical object is in the physical environment based on the image recognition;

generating, by the processor, in the user interface, a virtual interaction by the first virtual object with the first physical object so that the first virtual object is displayed to be overlaid onto the view of the physical environment and the first physical object and interact with the first physical object in the user interface, wherein the interaction comprises a visual change in behavior of the first virtual object;

transitioning, by the processor, from the first node in the narrative based on the first decision rule and the determination that the first physical object is in the physical environment; and updating, by the processor, the user interface to a second node in the narrative based on the transition from the first node, the second node comprising a result of the virtual interaction.

14. The method of claim 13, wherein the first decision rule further specifies a second physical object to be recognized to advance past the first node, the method further comprising:

advancing past the first node only if the second physical object is also determined to be in the physical environment based on the image recognition.

15. The method of claim 13, wherein the first decision rule specifies a plurality of physical objects, including the first physical object, to be recognized to advance past the first node, the method further comprising:

advancing to a second node responsive to a determination that a first set of objects among the plurality of objects is in the physical environment; and advancing to a third node responsive to a determination that a second set of objects among the plurality of objects is in the physical environment.

16. The method of claim 13, wherein the first decision rule further specifies an action to be performed with respect to the first physical object to advance past the first node.

17. The method of claim 16, wherein the user interface displays a first virtual object, the action to be performed comprises causing the first physical object to be within a sufficient proximity to a virtual object displayed by the user interface, the method further comprising:

determining whether the first physical object imaged in the user interface is within the sufficient proximity to the virtual object in the user interface.

18. The method of claim 17, wherein to determining whether the first physical object imaged in the user interface is within the sufficient proximity to the virtual object in the user interface comprises:

determining whether pixels of the first physical object imaged in the user interface is within a threshold number of pixels of the virtual object displayed in the user interface.

19. The method of claim 17, the method further comprising:

determining that the first physical object imaged in the user interface is within the sufficient proximity to the virtual object in the user interface;

determining that an interaction has occurred between the first physical object imaged in the user interface and the virtual object in the user interface based on the determination that the first physical object imaged in the user interface is within the sufficient proximity to the virtual object in the user interface; and displaying a result of the interaction in the user interface.

20. The method of claim 13, wherein the first decision rule further specifies a user-changed perspective in the physical environment to occur such that the first physical object has a certain size relative to the first virtual object.

* * * * *